US009990454B2

(12) United States Patent
Dhanwada et al.

(10) Patent No.: US 9,990,454 B2
(45) Date of Patent: Jun. 5, 2018

(54) EARLY ANALYSIS AND MITIGATION OF SELF-HEATING IN DESIGN FLOWS (71) Applicant: International Business Machines Corporation, Armonk, NY (US)

(72) Inventors: Nagashyamala R. Dhanwada, Fishkill, NY (US); William W. Dungan, Wappingers Falls, NY (US); Arun Joseph, Bangalore (IN); Sungjae Lee, Schenectady, NY (US); Arjen A. Mets, Sleepy Hollow, NY (US); Michael R. Scheuermann, Katonah, NY (US); Leon J. Sigal, Monsey, NY (US); Richard A. Wachnick, Mount Kisco, NY (US); James D. Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/172,912

(22) Filed: Jun. 3, 2016

(65) Prior Publication Data
US 2017/0351785 A1  Dec. 7, 2017

(51) Int. Cl.
*G06F 17/50* (2006.01)

(52) U.S. Cl.
CPC ........ *G06F 17/505* (2013.01); *G06F 17/5022* (2013.01)

(58) Field of Classification Search
USPC ........ 716/102, 104, 106, 108, 109, 133, 134
See application file for complete search history.

(56) References Cited

U.S. PATENT DOCUMENTS

| 8,019,580 | B1 | 9/2011 | Chandra et al. |
| 8,281,268 | B2 | 10/2012 | Yang et al. |
| 8,312,412 | B2 | 11/2012 | Tsujimura |
| 8,468,481 | B2 | 6/2013 | Nozawa et al. |
| 8,543,361 | B2 | 9/2013 | Chen et al. |
| 8,566,762 | B2 | 10/2013 | Morimoto et al. |

(Continued)

FOREIGN PATENT DOCUMENTS

| CN | 1330970 C | 8/2007 |
| EP | 2284740 A1 | 2/2011 |

(Continued)

*Primary Examiner* — Brian Ngo
(74) *Attorney, Agent, or Firm* — Scully, Scott, Murphy & Presser, P.C.; Steven J. Meyers (57) ABSTRACT A system and method for enabling the estimation and mitigation of self-heating in chip designs at a much earlier stage in a design flow. The system and method provides unique characterization of each standard cell in a library for its effective thermal resistance based on the topology and layout of the cell, and brings this per standard cell instance based delta-T to be available for the timing closure tools when completing a synthesized design. Thus, at the timing closure process, the generated design is free of self heating violations. The method computes a unique thermal resistance characterization on per standard cell manner—based on the topology, function and layout of the standard cell, and uses that to compute the deltaT per instance of the design. This information is presented to a violation mitigation tool which changes the power levels of the cells, logic function to mitigate the self heating violations.

20 Claims, 6 Drawing Sheets (56) References Cited

U.S. PATENT DOCUMENTS

| | | |
|---|---|---|
| 8,689,161 B2 | 4/2014 | Rao et al. |
| 8,726,201 B2 | 5/2014 | Bickford et al. |
| 2003/0063437 A1 | 4/2003 | Kurihara |
| 2008/0086709 A1 | 4/2008 | Rittman |
| 2011/0283249 A1 | 11/2011 | Bickford et al. |
| 2012/0011484 A1 | 1/2012 | Rao et al. |
| 2012/0022846 A1 | 1/2012 | White et al. |
| 2015/0054567 A1 | 2/2015 | Rasouli et al. |
| 2016/0224717 A1* | 8/2016 | Poindexter .......... G06F 17/5081 |

FOREIGN PATENT DOCUMENTS

| | | |
|---|---|---|
| EP | 2284740 B1 | 1/2012 |
| JP | 2798048 B2 | 9/1998 |

* cited by examiner

FIG. 3A $$R_{th} = \frac{1}{G_{th}} = \frac{1}{NFIN \cdot NF \cdot G_{thArea} + NFIN \cdot G_{thNFIN} + NF \cdot G_{thNF}}$$

EARLY ANALYSIS AND MITIGATION OF SELF-HEATING IN DESIGN FLOWS

FIELD

The present disclosure relates to the design and analysis of CMOS digital circuitry, and more particularly to accurately and efficiently analyzing the impact of self-heating in chip designs at a much earlier stage in the design flow.

BACKGROUND

In modern CMOS chip designs, as devices have scaled into a regime with channel lengths below 50 nm, the heat generated by switching of digital logic gates or by their leakage, can no longer be efficiently dissipated through the substrate. Recent developments in silicon technology have exacerbated this issue, while at the same time, interconnect reliability is becoming increasingly subject to electro-migration stress in advanced technology nodes due to a breakdown in the classical scaling of such devices.

Supplying and dissipating power in a chip has been a module and chip design issue. Scaled CMOS design devices with higher power density are hot, especially with large, multi-finger FETs. Self-heating of devices during normal circuit operation is becoming significant and could cause Back End of the Line reliability and Electro Migration wear out issues. This issue of device self-heating is getting worse as technology scales. Preliminary CAD simulations and hardware temperature measurements show a 2× increase in deltaT (i.e., a temperature change from ambient) going from 22 nm to 14 nm technology nodes. In order to maintain reliable operation of a chip there is a need to maintain the temperature increase at an acceptable range.

Localized self heating in which heat is dissipated through devices, wires and substrate is a serious concern that must be managed across IP types by the design methodology in high-performance chip design.

SUMMARY

Accordingly, in an embodiment, a system and method for managing self-heating efficiently through a semiconductor device design process. The system is a comprehensive framework including different solution approaches to assess and mitigate self-heating issues in high performance designs.

One framework approach implementing techniques to help designers quickly determine a deltaT (temperature change from ambient) value, as well as techniques to create synthesized blocks with more uniform temperature profiles.

The framework approach brings together workload specific switching data, detailed power models, and thermal modeling to help assess self heating impacts from an early stage to a detailed sign-off stage.

In one embodiment, encapsulated self heating APIs are built on top of the various analysis techniques to guide design optimization and closure tools to be self-heating aware. The framework thus efficiently and accurately predicts overheating at the time of the macro constructions at a fraction of time with comparable accuracy to detailed field solver based approaches, and hardware measurements.

In one aspect, there is provided a method of reducing self-heating in semiconductor integrated circuit designs. The method comprises: accessing, at a processor unit, a logic and layout data representing a macro having an interconnection of one or more cells; computing, at the processor unit, an effective thermal resistance value (Rth) for a cell of the macro based on a cell topology; analyzing, at the processor unit, activities of a workload in which the macro cell is to be subjected; determining from the analyzing activities, a Switching Factor (SF) data representing an amount of physical switching of a logic gate of the macro cell; computing a change in temperature (deltaT) value using the Rth value and the SF data for a macro cell instance; determining whether a deltaT value computed for the macro cell instance is in violation of a self-heating limit; and mitigating a self-heating of the macro cell design if a self-heating limit violation is detected.

In a further aspect, there is provided a system of reducing self-heating in semiconductor integrated circuit designs. The system comprises: a memory storage device; a processor unit in communication with the memory storage device and configure to: access a logic and layout data representing a macro having an interconnection of one or more cells; compute an effective thermal resistance value (Rth) for a cell of the macro based on a cell topology; analyze activities of a workload in which the macro cell is to be subjected; determine from the analyzing activities, a Switching Factor (SF) value representing an amount of physical switching of a logic gate of the macro cell; compute a change in temperature (deltaT) value using the Rth value and the SF value for a macro cell instance; determine whether a deltaT value computed for the macro cell instance is in violation of a self-heating limit; and mitigate a self-heating of the macro cell design if a self-heating limit violation is detected.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

The present disclosure will be understood and appreciated more fully from the following detailed description of the disclosure, taken in conjunction with the accompanying drawings.

DETAILED DESCRIPTION

In an embodiment, a method of the present disclosure is described hereinafter. However, it is to be understood that the disclosed embodiments are merely illustrative of the described methods that can be embodied in various forms. In addition, each of the examples given in connection with the various embodiments of the disclosure is intended to be illustrative, and not restrictive.

Figure 1:
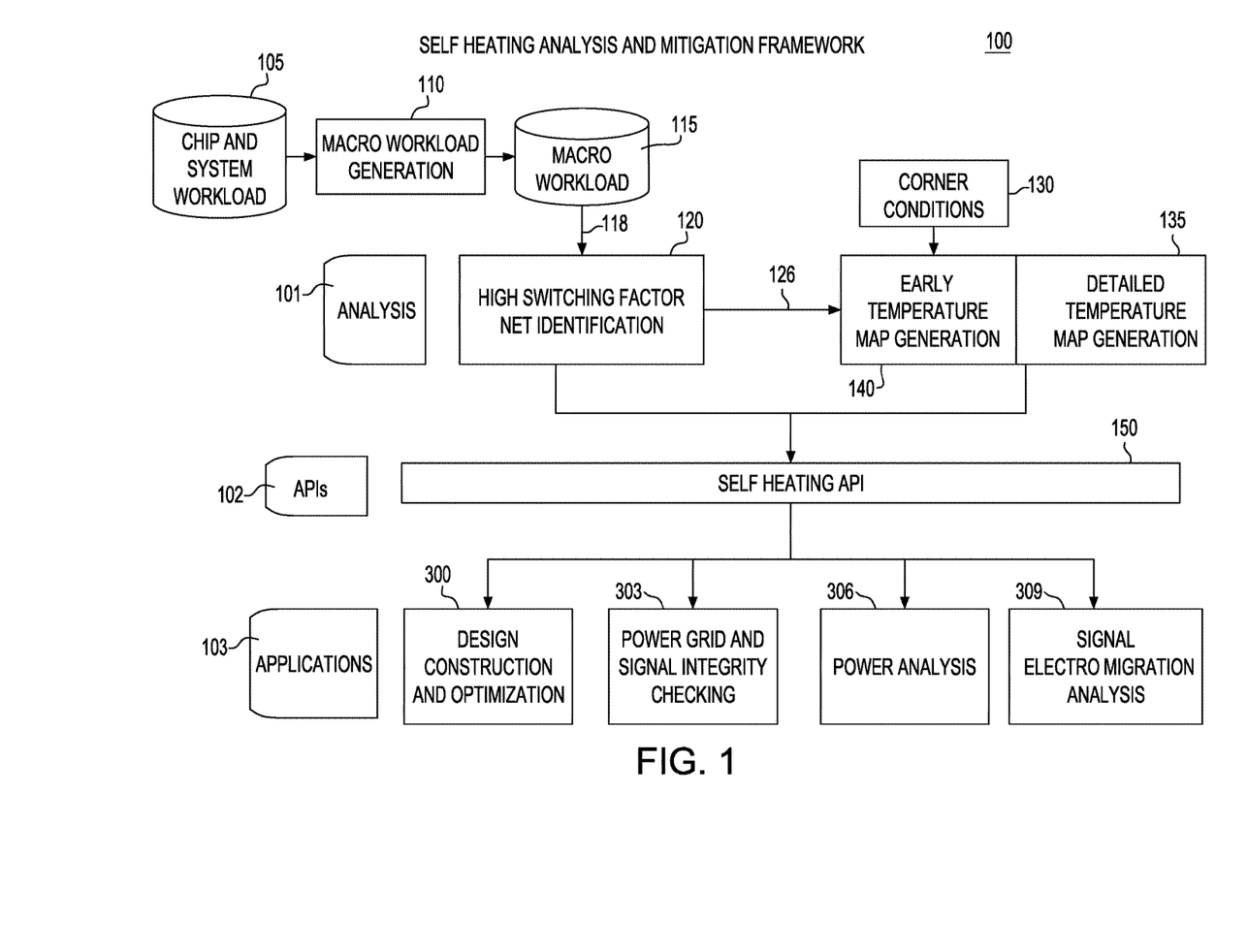
FIG. 1 is a diagram depicting the components of the self heating analysis and mitigation framework used in a gate level design flow process according to one embodiment of the disclosure.

As shown in FIG. 1, the present disclosure provides a self heating analysis and mitigation framework system 100 to assess the self heating impacts at the silicon level while a macro design is being constructed (i.e., early on in the design process). Additionally, the disclosure describes use of efficient techniques to drive the fix-up of any self heating errors so that the design is free of any self heating violations.

The self heating analysis and mitigation framework is a system 100 shown in FIG. 1 having an analysis phase 101, one or more application interfaces 102, i.e., handling communications between various applications 103 in the analysis of a macro or chip under workflow conditions. In one embodiment, components of system 100 include a macro workload generator 110 for processing higher level workloads, e.g., workloads intended for the processor unit, core, or chip, and creating macro level workloads that are stored in a macro workload database 115. As known, a macro is a lower level block of logic of a higher (hierarchical) level chip design. The data input to macro workload generator 110 for computing a macro specific workload may be obtained from a chip and system workload database 105.

In one embodiment, the chip and system workload database 105 stores standard cell design data for a higher level chip (or set of chips), e.g., that may make up a very-large-scale integration (VLSI) design or an application specific integrated circuit (ASIC) or field programmable gate array (FPGA), etc. The macros may include all structures and devices that make up the chip(s) with, in some instances, a particular macro being designed out of context from the chip. Each standard cell includes data at the transistor (gate) level, which data may represent but is not limited to: a group of transistors and interconnect structures that provide a logic function (e.g., a boolean operation such as AND, OR, XOR, XNOR, or inversion) or a storage function (flipflop or latch). In one embodiment, data is provided to the system in the form of a gate transistor level netlist which describes (a set of transistor gates in a macro), their connections to each other, and of their terminals (ports) to an external environment for a given macro or logic device. Such standard cell or macro design data may include standard cell power rule data and may include a thermal resistance or RTH value which are computed as part of a cell library characterization process.

In one embodiment, a workload data stored in chip and system workload database 105 may include data representing types of applications or workloads that are to be run on the chip. For example may comprise a video streaming application, or a compression algorithm running on the chip, or other processing workloads applicable to the whole chip which, when run, exercise different portions of the entire chip. The macro workload generator 110 thus determines from the workloads applicable to the whole chip, and derives or extracts the activity or workload pertaining to a set of gates of a given gate level macro, region or piece of the entire chip. A netlist "gate" is alternatively referred to herein as a cell or standard cell (StdCell).

As a macro is typically designed out of context from a particular chip or workload, an analysis is conducted at this early stage to ensure that when it is being designed for timing and power constraints, there is performed a check for the self-heating of the macro based on anticipated workloads to ensure self-heating is within limits.

In the self heating analysis and mitigation framework is a system 100, a self-heating analysis phase 101 invokes a high switching factor net identification module 120 to receive macro specific workload data and macro (e.g., gate level) netlist data 118 to determine a Switching Factor (SF) 126 for the specific macro of a particular chip design. In one embodiment, the macro workloads or activities obtained by the macro workload generator 110 are mapped to the design instances in the macro (gates and nets). From the specific workload, and based on the logic description of that macro, there is derived activities on the different pieces of the macro to determine the switching of gate(s) or nets (connections) of that macro. The amount of switching or switching factor (SF) refers to a switching rate of a gate or net from a first logic value (0 or 1) to second logic value (1 or 0) value. For example, a SF of 0.5 indicates that a particular gate operation is switched from logic 0 to logic 1 (or logic 1 to logic 0) about 50% of the time. The computing of workload specific Switching Factors 126 on nets within the macro, may be used by the early temperature map generator 140 for identifying the gates susceptible for fails, as well as for the dynamic power calculation which is used in the early temperature map generation analysis phase.

Further, in the self-heating analysis phase 101 of the self heating analysis and mitigation framework of FIG. 1, an Early Temperature map generation module 140 implements steps of using the RTH values present in the standard cell power rules and computing a "power number" (power consumed by that standard cell instance, i.e., a sum of dynamic power (which is a function of the switching of the gate) and the leakage or static power (e.g., in milliwatts) at each standard cell instance in the macro design. This power number is based on macro specific activities. As a result, there is computed a deltaT value at each macro instance. The deltaT values may then be communicated to one or more applications 103 through various self heating application programming interfaces (APIs) 102 to determine if any self-heating violations may exist which would require further macro design refinements or design optimization. For example, as shown in FIG. 1, the delta T data values are provided efficiently to the one or more various applications such as a design optimization module 300, a power grid and signal integrity checking application 303, a power analysis application 306 and a signal electromigration analysis application 309, which applications utilize the computed deltaT for the particular macro(s) in various ways. For example, the power analysis module 306 uses the deltaT values to compute the total leakage power consumed by the design more accurately using the local temperature information coming from the self heating API. The design optimization application will use the deltaT data in addition to other timing and power constraints in order to optimize the design while maintaining the thermal integrity of the design by not creating any self heating violations.

Figure 2A:
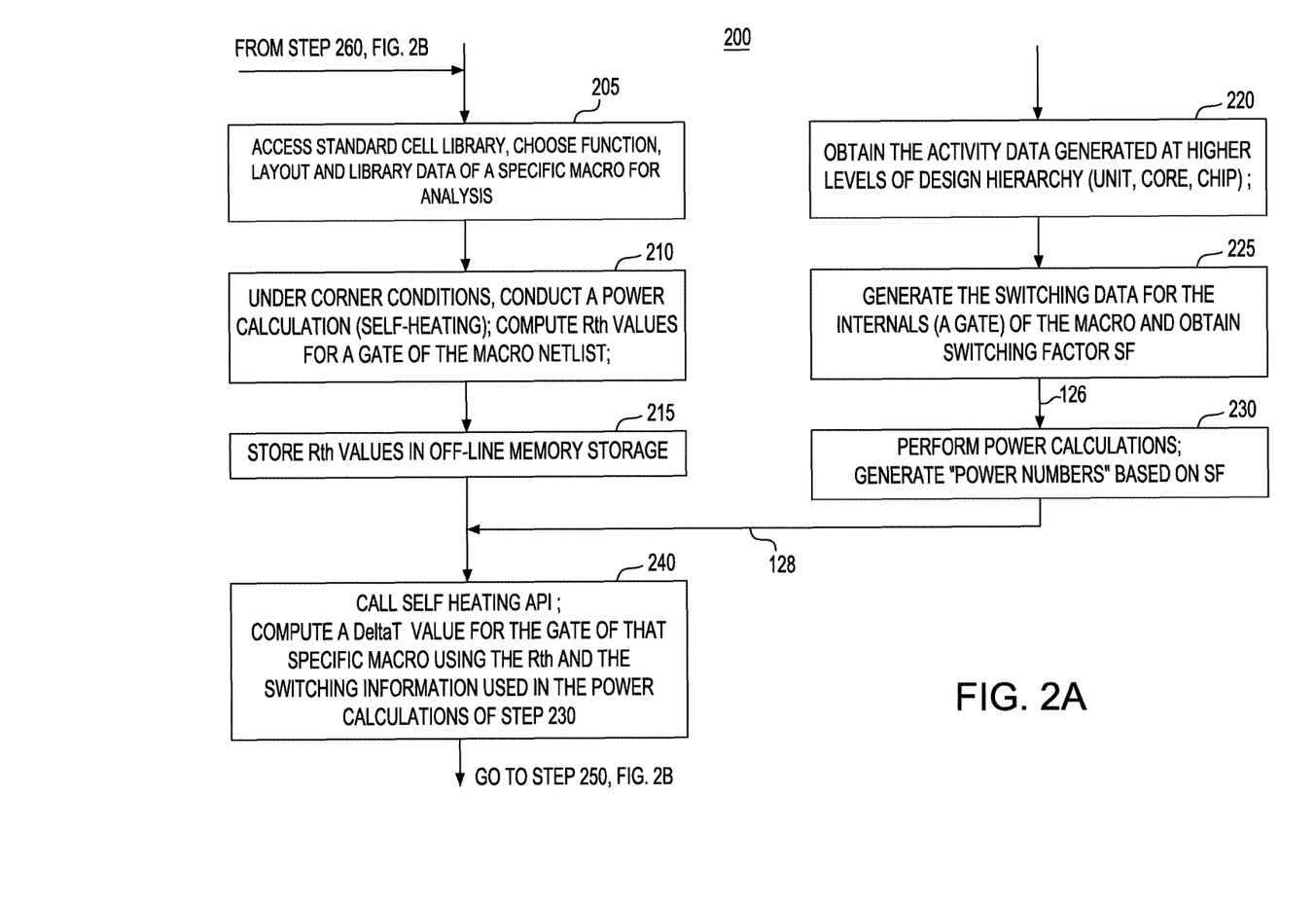
FIGS. 2A-2B is a flow diagram of a method for early temperature map generation according to one embodiment of the disclosure.

FIG. 2A depicts a process flow 200 of the self heating analysis and mitigation framework 100 of FIG. 1. In a first processing path, an initial step 205 includes accessing or receiving, at a programmed computer or processor unit, data representing a standard (std) cell layout of a std cell schematic 210, e.g., a gate in a library. In the early temperature map generation process, at 210, there is performed a step of computing an effective thermal resistance value "RTH" for each gate of the std cell from schematic/layout of the standard macro considering topology of a cell, e.g., the fingers, fin count, etc. and considering, e.g., the "corner conditions" 130 such as process, voltage and temperature conditions under which the self-heating analysis of that macro is conducted. The RTH values from the RTH characterizations generated at 210, FIG. 2A for each gate of the macro netlist the RTH characterization values may be stored in the power rule for the standard cell and/or in off-line storage at 215.

In a parallel processing path as shown in FIG. 2A, or alternatively, as subsequent processing steps, the high switching factor net identification module 120 is invoked to receive macro specific workload data and macro (e.g., gate level) netlist data to determine a Switching Factor (SF) for each gate of a chip design. That is, in the parallel path, the high switching factor net identification module 120 performs, for a macro specific workload at the standard cell, activity processing 220 to determine the Switching Factor (SF) for the selected gate of the macro of the chip design at 225. During this activity processing, the method uses activity data generated at higher levels of design hierarchy (e.g., unit, core, chip), and generates switching data 126 for the internals of a macro, all the while considering the mapping between logical and physical hierarchies. In the implementation of a chip in a hierarchical design flow, the logical hierarchy of the design could be different from the physical hierarchy of the design. Analysis tasks like self heating when done of the physical hierarchy of the design, are reconciled with what signal in the activity files (which are derived from the logical hierarchy) correspond to what portion of the design in the physical hierarchy.

In one embodiment, step 220 performs "intelligent" activity processing from real workloads considering logical to physical mapping, along with other limit constraints to generate activities that are relevant for analyzing Self heating fails. While typically, activities (where switching activity for nets in the design is asserted to some pre-specified values) would be completely asserted. Another approach would be to be completely workload driven, where certain inactive regions might be missed; on the other hand increasing across the board activity limit might be too pessimistic. However, in one embodiment, the approach of the present disclosure uses workloads intelligently along with floor functions with user defined limits to determine the activities to be used for the self heating calculations.

Then, at 230, FIG. 2A, a power calculation is performed based on the macro specific activities and internal switching factor to obtain the power number. The computing of the power for the particular macro or std cell instance uses the workload specific switching factor data 126 received or accessed from the high switching factor net identification step. The calculation of a power number may involve known techniques for computing dynamic leakage power using capacitance, voltage and SF parameters.

Then, continuing at 240, FIG. 2A, a self-heating application program interface (API) is called to calculate a deltaT value for the current gate of that specific macro under analysis using the stored Rth value from the power rule and using switching information 128, e.g., power number value, calculated for the particular macro instance from the power calculation at 230. This deltaT value is representative of the self-heating of the gate of the macro under design based on the corner conditions and switching activity. In one embodiment, the self-heating API computes an increase in temperature above ambient, DeltaT efficiently using the computed thermal resistance, Rth, and the switching information 128. The API invokes functions to compute the power using the workload specific switching data along with other activity assertions (which can be user defined switching factor activity assertions) to ensure adequate coverage. These data are provided efficiently to the various applications like design optimization module 300.

In one embodiment, the self-heating API computes the power by using the workload specific switching data if it is above a particular threshold, else it has mechanisms to fall back to the more conservative user defined switching data. In terms of getting the switching information it also has the mechanism of activity floor functions which are registered to selectively override the workload data on a per functional gate basis to prevent any optimistic power estimation to drive the deltaT computation.

In computing such an instance deltaT value, self-heating APIs 150 are used to invoke other applications to access and process data used for computation.

Figure 2B:
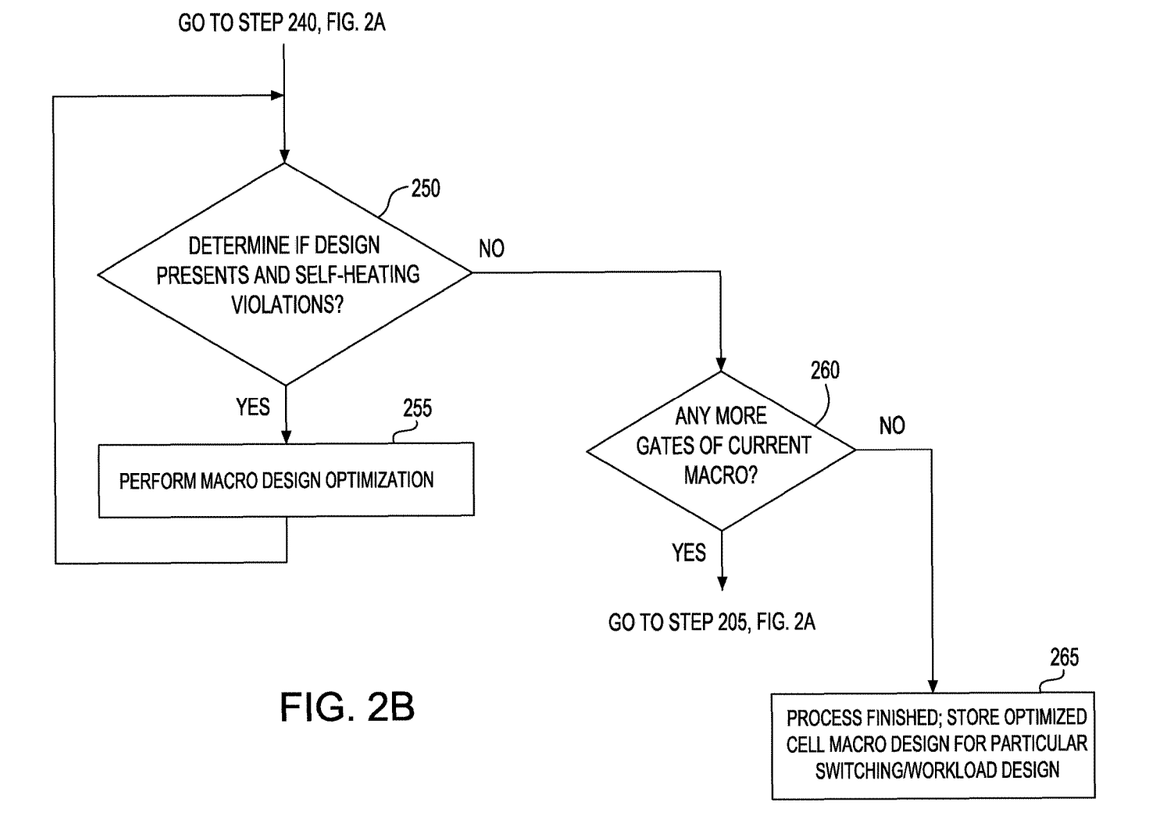

Continuing to step 250, FIG. 2B, a determination is then made as to whether the macro design presents any self-heating violations. In one embodiment, the deltaT instance value data is efficiently provided via the self-heating API to a design optimization application. The call to a design optimizer addresses self heating in both the construction phase, and as a fix up step, where the objective would be to address any self heating violations without impacting the timing and with minimal area overhead. To detect a self-heating violation, at 250, the self-heating API 150 looks through the micro-design, obtains the Rth characterization and power information, and calculates deltaT value of that instance. This calculated deltaT instance is compared against a user set threshold value, to determine a self-heating violation. For example, if the deltaT computed for the gate of the particular macro is determined above a self-heating value limit or threshold, e.g., is greater than 5° C., then the design construction and optimization application module 300 may be invoked at 255 to optimize the macro design and ensure a self heating violation free design.

Otherwise, at 250, if it is determined that the computed deltaT value for the current gate of the macro is within the user-defined self-heating value threshold given the intended corner conditions and switching factors, the process proceeds to 260 to determine whether there is any more gates of the specified macro design for which the self-heating analysis calculation is to be performed. If there are more gates in the particular cell macro, then the process returns back to step 205, FIG. 2A, in order to proceed in the self-heating analysis conducted in FIG. 2A processing for the next gate of the macro's netlist.

If at 260, it is determined that all of the gates for the current macro or cell netlist are optimized to provide no self-heating issues for the intended switching/workload design, then at 265 the process ends and the optimized data for that macro may be stored in the cell library for later use in a chip design context.

Returning to step 255, FIG. 2B, in one embodiment, through the self heating API, the design construction and optimization application module 300 is invoked to receive and use the switching and deltaT information to perform one or more steps addressing the self heating either in both the construction phase and as a "fix up" step, where the objective addresses any self heating violations without impacting the timing and with minimal area overhead. Such further design optimizations performed may include, but are not limited to: steps to sharpen input slews, or change power level of the gates, or change a logic function, in order to mitigate or minimize the self-heating violations that are found responsive to the comparison made at 250.

In one embodiment, for cell self-heating mitigation, the design construction and optimization step uses Self Heating API using the early temperature map generation approach, to limit gain on high SF gates and isolate them.

In alternative embodiments, to minimize the self heating violations, there may be performed steps to: 1) Identify High SF nets through the self heating API and Isolate High SF gates; 2) Limit a maximum gain of said devices. For example: INVERT: NAND/NOR: AOI/OAI (And Or Invert/Or And Invert Logic Functions); 3) Identify clock nets and perform 1)-3) in addition to sharpening input slew rates; 4) Use special gates that use fewer FINs per finger; and/or 5) Change the power level (power up) to reduce the local self heating.

The self heating API through an initial analysis of the design, orders and provides the list of violating gates to the optimization module 300, which in an incremental manner makes the fix up changes and queries the self heating API to create a design which would have a uniform temperature profile.

Figure 3A:
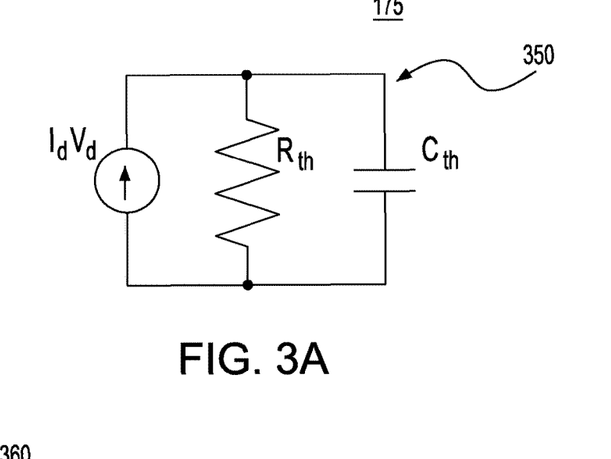
FIG. 3A depicts an example power model of an example gate or cell used in a self-heating analysis that can be included in the library characterization of a macro in one embodiment.

FIG. 3A shows one embodiment of an example analytical model 175 that computes the deltaT using the area and perimeter component of a standard cell, which makes it possible to compute deltaT with fairly high accuracy to be used during the design construction phase.

In the example analytical model 175 shown in FIG. 3A, there is provided an equivalent model 350 of an example macro cell transistor gate (circuit) of a standard cell in which the methods described herein may be applied. The circuit of FIG. 3A includes a model 350 of a parallel configured thermal resistance and capacitance based receiving current from a power source (Id×Vd).

The analytical methodology 200 of FIGS. 2A, 2B may be used to compute the deltaT using the area and perimeter components, which makes it possible to compute deltaT with fairly high accuracy for use during the design construction phase. Here, the Rth value is a thermal resistance (e.g., units of deg C./W), a constant value between device temperature increase and dissipated power. That is, for this model, the DeltaT (DT) value is computed as:

$$DT = Rth \times \text{Power}$$

where DT is proportional to the dissipated power with a proportionality constant of Rth such that: Gth=1|Rth, where Gth is the thermal conductivity. The Rth×Cth determines a self-heating time constant with Cth representing a device's "heat capacity". In one embodiment, deltaT value is to voltage and $R_{th}0$ is normalized by device width (W) as follows:

$$R_{th} = R_{th}0/W$$

Figure 3B:
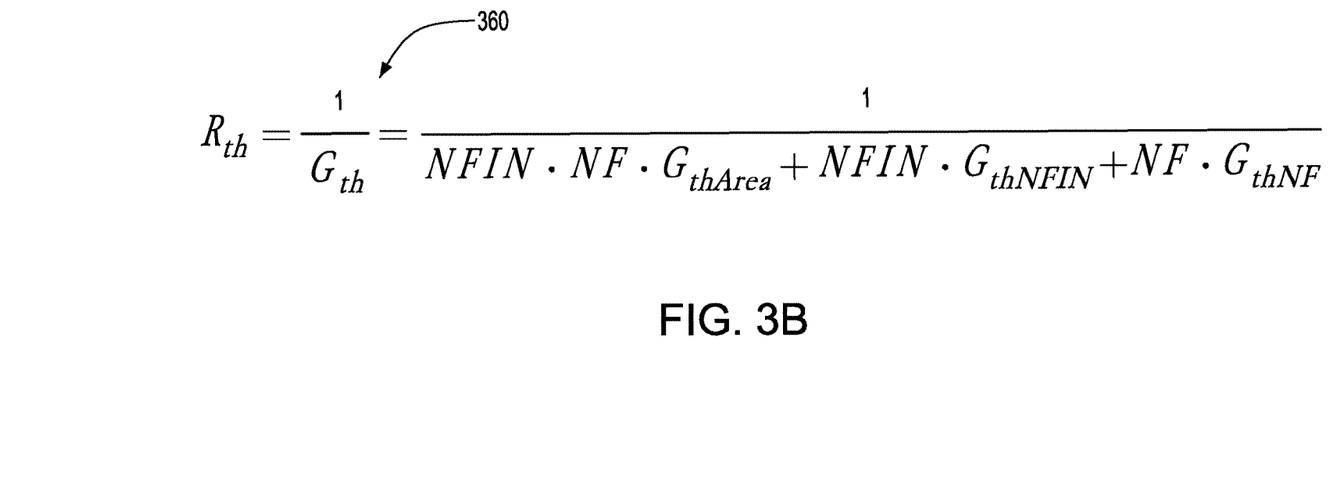
FIG. 3B shows a method of computing a deltaT value for a standard cell FINFET gate or cell in one embodiment.

An example physical and scalable thermal RC model of a standard cell FinFET which is used in the early temperature map generation step 210 of FIG. 2A that computes a gate Rth value, is depicted according to the following equation 360 shown in FIG. 3B as follows:

$$Rth = \frac{1}{Gth} = \frac{1}{NFIN \cdot NF \cdot G_{thArera} + NFIN \cdot G_{thNFIN} + NF \cdot G_{thNF}}$$

where, for example, NFIN is the number of fins (in the FinFet) being modeled; NF is a number of fingers of the FinFet within which captures the area component and perimeter component.

In one embodiment of a process at step 210, FIG. 2A for generating the Rth values for the standard cells as a part of the standard cell power rule generation process, given an Rthcharacterization for the standard cell library:

For each of PFET and NFET:
If the standard cell is a split inverter: Then sum up total number of FINGERs for A, multiply by 1.5, round up to closest integer;
Else if standard cell is a buffer or HPINV: Then sum up total number of FINGERs (both stages in buffers), divide by 2, round up to closest integer;
Else: sum up total number of FINGERs for all inputs (for NAND2 example, $NF=NF_A+NF_B=4+4=8$);
Use NFIN for one of FINGERs (NFIN is uniform for all FINGERs)
Using above NF and NFIN, obtain RTH0 from model.
If standard cell is a buffer or HPINV: Then compute $Rth_{NFET}$ and $Rth_{PFET}$ as 0.65*Rth0/(NF*NFIN*FPITCH) (0.65 is 1.3/2, where 1.3 is due to extra nesting, and 2 is because there is 2 RX beds in parallel);
Else: compute $Rth_{NFET}$ and $Rth_{PFET}$ as Rth0/(NF*NFIN*FPITCH), where FPITCH is the Fin Pitch.

$$\text{Final} \quad Rth = 1.3*(Rth_{NFET}||Rth_{PFET}) = 1.3*\{1/(1/Rth_{NFET}+1/Rth_{PFET})\}$$

Both PFET and NFET help to dissipate heat. Also, models for RTH0 assume isolated PFET and NFET. Since, in a stdCell, PFET and NFET are next to each other, there as an additional 30% increase in Rth0.

This final Rth value will be entered into the power rule, and will be used by the Self Heating API as a part of the deltaT calculations.

Figure 4:
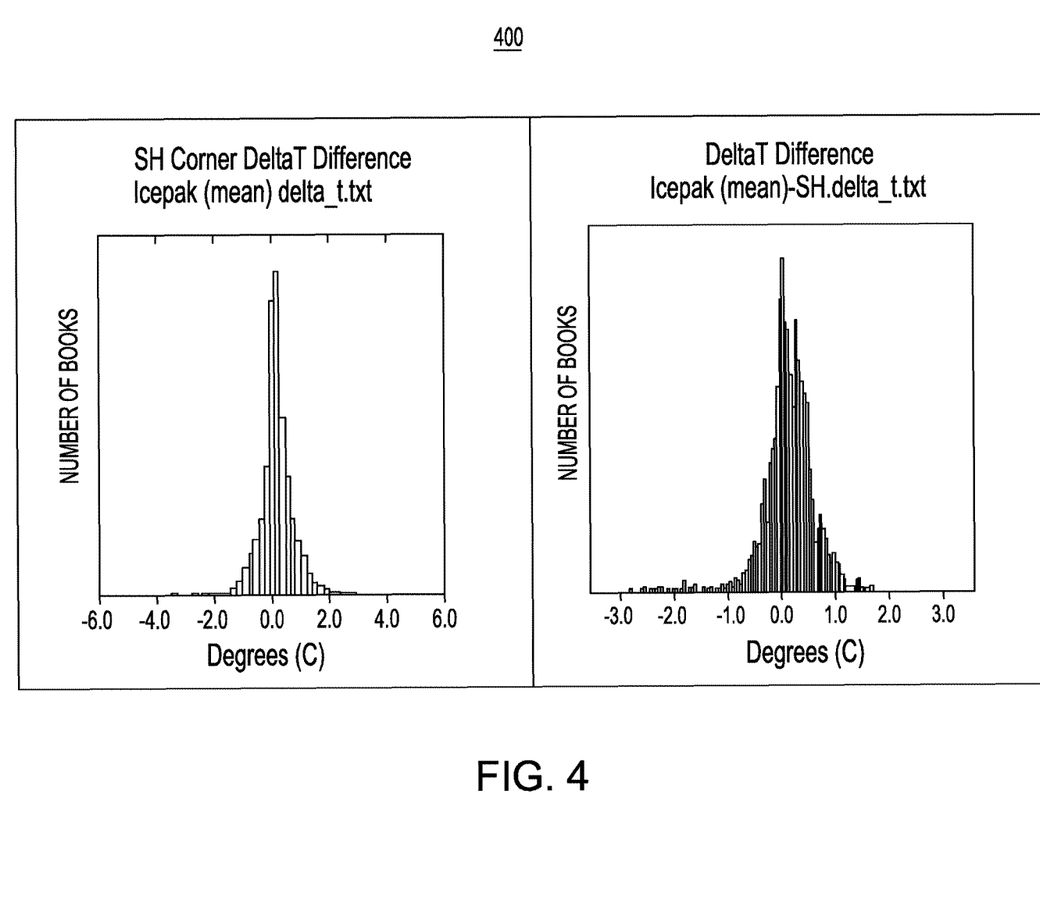
FIG. 4 depicts an exemplary comparison of the accuracy of the deltaT map generation approach against a detailed field solver based thermal simulation approach.

FIG. 4 depicts a comparison of the accuracy of the deltaT map generation approach 400 against a detailed field solver based thermal simulation approach 450 (e.g., using ANSYS Icepak™) on two gate level macros from a load/store unit of a high performance micro processor design. As shown, the DeltaT value from an ambient of 50° C. Max difference between predicted and actual dT was around 2° C. on certain non-critical areas. The run time using the deltaT map generation approach 400 was about 50× faster.

Figure 5:
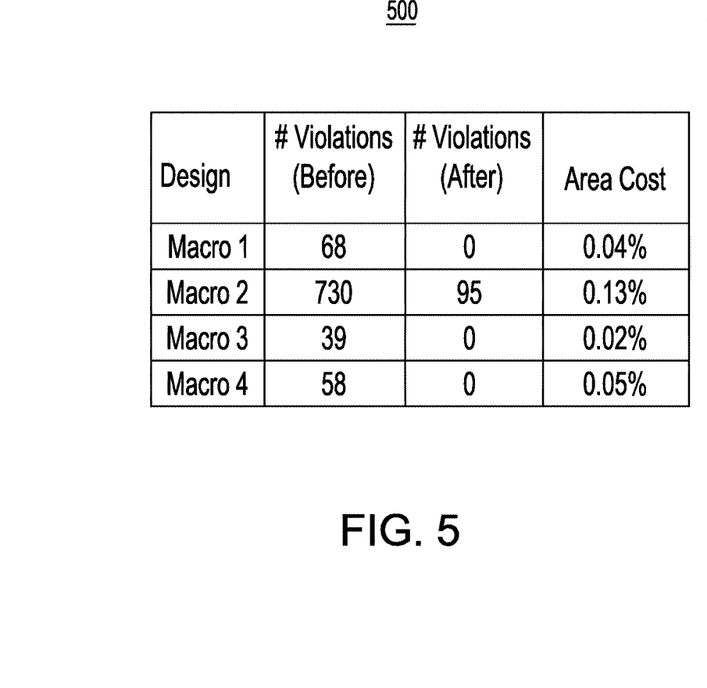
FIG. 5 shows a snapshot depicting an automatic self heating violation mitigation during design construction of various example macro designs using the deltaT map generation approach of the embodiments described.

FIG. 5 shows a snapshot 500 of automatic self heating violation mitigation during design construction of various Macro designs, Macro_1 through Macro_4 using the early deltaT temperature map generation approach. As shown in FIG. 5, the snapshot depicts the mitigating of self-heating violations of gates for each macro without using the deltaT map generation approach and after using the deltaT map generation approach. The activity conditions the macros were subject to included: 35% switching, no clock gating, and a self-heating violation threshold set of 5° C. at a minimum area cost.

Figure 6:
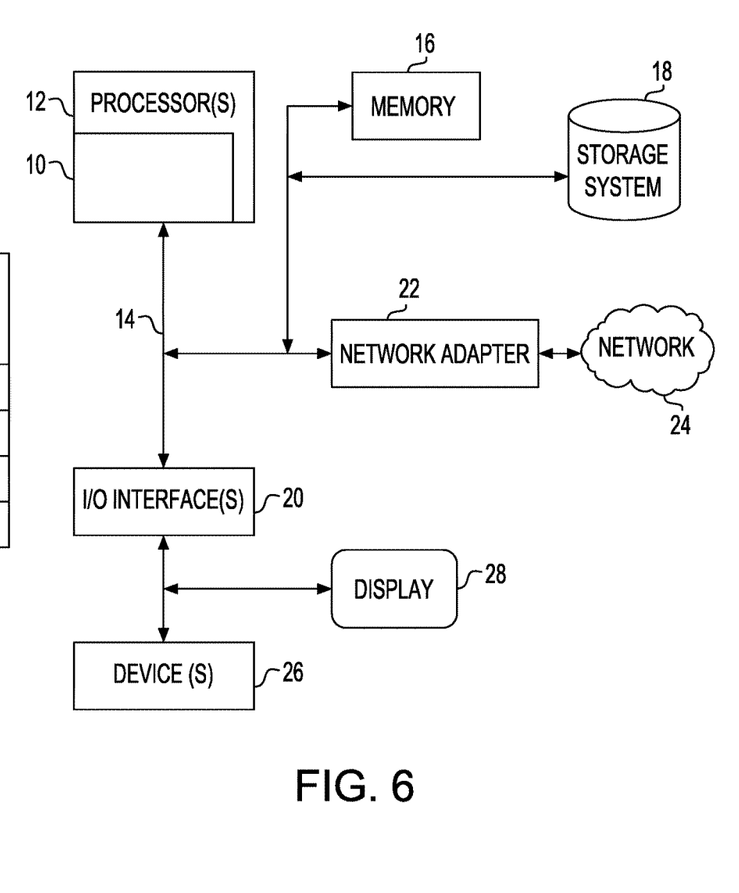
FIG. 6 illustrates one embodiment of an exemplary hardware configuration of a computing system programmed to perform the method steps described herein.

In sum, the present approach efficiently and accurately predicts overheating at the time of macro construction at a fraction of time with comparable accuracy to detailed field solver based approaches, and hardware measurements FIG. 6 illustrates a schematic of an example computer or processing system 10 that may implement the methods for early analysis and mitigation of self-heating in design flows in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing framework shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of reducing self-heating in semiconductor integrated circuit designs comprising:
    accessing, at a processor unit, a logic and layout data representing a macro having an interconnection of one or more cells;
    computing, at the processor unit, an effective thermal resistance value (Rth) for a cell of the macro based on a cell topology;
    accessing, by the processor unit, activity data generated at a higher level of an integrated circuit design hierarchy;
    generating, by the processor unit, based on said activity data, a workload specific to the macro;
    determining, by the processor unit, from said macro specific workload, and based on a logic description of said macro, a workload specific Switching Factor (SF) value representing an amount of physical switching of an internal logic gate of the macro cell;
    computing a change in temperature (deltaT) value using the Rth value and said SF value for a macro cell instance;
    determining whether a deltaT value computed for the macro cell instance is in violation of a self-heating limit;
    mitigating a self-heating of the macro cell design if a self-heating limit violation is detected; and
    updating the layout data after mitigating of the self-heating.

2. The method of claim 1, wherein said computing the deltaT value comprises:
    calculating a power number value for the particular macro cell instance based on said switching factor value and a pre-determined power rule; and
    using said power number value and said Rth value in said deltaT computing.

3. The method of claim 1, wherein said self-heating limit is a pre-determined power budget, said method further comprising:
comparing said deltaT value against the pre-determined power budget to determine if the self-heating limit has been violated; and
optimizing the macro cell design to avoid the self-heating threshold violation.

4. The method of claim 1, wherein said:
said higher level of a design hierarchy comprises a unit, a core, or a chip level.

5. The method of claim 1, further comprising:
maintaining a mapping between logical and physical hierarchies.

6. The method of claim 2, wherein said computing said Rth value considers a process, voltage and temperature condition applied to said cell.

7. The method of claim 1, wherein for each cell of the macro, storing the Rth characterization values into the power rule associated with the standard cell, or storing the Rth characterization values in an off-line memory storage device.

8. The method of claim 1, wherein a macro cell represents a FinFET device comprising: a number of fingers and a number of Fins, wherein said mitigating a self-heating of the macro cell design comprises one or more of: sharpening input slew rate at the cell, changing a power level of the macro cell, decreasing a number of Fins per cell finger, and changing a logic function of said macro.

9. A system of reducing self-heating in semiconductor integrated circuit designs comprising:
a memory storage device;
a processor unit in communication with said memory storage device and configure to:
access a logic and layout data representing a macro having an interconnection of one or more cells;
compute an effective thermal resistance value (Rth) for a cell of the macro based on a cell topology;
access activity data generated at a higher level of an integrated circuit design hierarchy;
generate based on said activity data, a workload specific to the macro;
determine from said macro specific workload, and based on a logic description of said macro, a workload specific Switching Factor (SF) value representing an amount of physical switching of an internal logic gate of the macro cell;
compute a change in temperature (deltaT) value using the Rth value and said SF value for a macro cell instance;
determine whether a deltaT value computed for the macro cell instance is in violation of a self-heating limit;
mitigate a self-heating of the macro cell design if a self-heating limit violation is detected; and
update the layout data after mitigating of the self-heating.

10. The system of claim 9, wherein to compute the deltaT value, said processor unit is further configured to:
calculate a power number value for the particular macro cell instance based on said switching factor value and a pre-determined power rule; and
using said power number value and said Rth value in said deltaT computing.

11. The system of claim 9, wherein said self-heating limit is a pre-determined power budget, said processor unit is further configured to:
compare said deltaT value against the pre-determined power budget to determine if the self-heating limit has been violated; and
optimize the macro cell design to avoid the self-heating threshold violation.

12. The system of claim 9, wherein
said higher level of a design hierarchy comprises a unit, a core, or a chip level.

13. The system of claim 9, wherein said processor unit is further configured to:
maintain a mapping between logical and physical hierarchies.

14. The system of claim 10, wherein to compute said Rth value, said processor device is further configured to consider a process, voltage and temperature condition applied to said cell.

15. The system of claim 9, wherein said processor device is further configured to: for each cell of the macro: storing the Rth characterization values into the power rule associated with the standard cell, or storing the Rth characterization values in an off-line memory storage device.

16. The system of claim 9, wherein a macro cell represents a FinFET device, said cell topology comprising: a number of fingers and a number of Fins of said FinFET, wherein to mitigate a self-heating of the macro cell design, said processor device is further configured to one or more of: sharpen an input slew rate at a macro gate, change a power level of the macro gate, decrease a number of Fins per cell finger, and change a logic function of said macro.

17. A computer program product comprising a non-transitory computer readable storage medium storing a program of instructions executable by a machine to perform a method of reducing self-heating in semiconductor integrated circuit designs, the method comprising:
accessing a logic and layout data representing a macro having an interconnection of one or more cells;
computing an effective thermal resistance value (Rth) for a cell of the macro based on a cell topology;
accessing activity data generated at a higher level of an integrated circuit design hierarchy;
generating based on said activity data, a workload specific to the macro;
determining from said macro specific workload, and based on a logic description of said macro, a workload specific Switching Factor (SF) value representing an amount of physical switching of an internal logic gate of the macro cell;
computing a change in temperature (deltaT) value using the Rth value and said SF value for a macro cell instance;
determining whether a deltaT value computed for the macro cell instance is in violation of a self-heating limit;
mitigating a self-heating of the macro cell design if a self-heating limit violation is detected; and
updating the layout data after mitigating of the self-heating.

18. The computer readable storage medium as claimed in claim 17, wherein said computing the deltaT value comprises:
calculating a power number value for the particular macro cell instance based on said switching factor value and a pre-determined power rule; and
using said power number value and said Rth value in said deltaT computing.

19. The computer readable storage medium as claimed in claim 17, wherein said self-heating limit is a pre-determined power budget, said method further comprising:

comparing said deltaT value against the pre-determined power budget to determine if the self-heating limit has been violated; and optimizing the macro cell design to avoid the self-heating threshold violation.

20. The computer readable storage medium as claimed in claim 17, wherein said:

higher level of a design hierarchy comprises a unit, a core, or a chip level.

* * * * *